United States Patent
Ribeiro et al.

(10) Patent No.: US 9,736,833 B2
(45) Date of Patent: Aug. 15, 2017

(54) SET UP AND MAINTENANCE FRAMEWORK FOR FLEXIBLE TIME DIVISION DUPLEX OPERATION IN HETEROGENEOUS NETWORK

(71) Applicant: Nokia Corporation, Espoo (FI)

(72) Inventors: Cassio Barboza Ribeiro, Espoo (FI); Michal Cierny, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/397,270

(22) PCT Filed: May 7, 2013

(86) PCT No.: PCT/FI2013/050505
§ 371 (c)(1),
(2) Date: Oct. 27, 2014

(87) PCT Pub. No.: WO2013/167807
PCT Pub. Date: Nov. 14, 2013

(65) Prior Publication Data
US 2015/0078216 A1    Mar. 19, 2015

Related U.S. Application Data

(60) Provisional application No. 61/645,844, filed on May 11, 2012.

(51) Int. Cl.
H04W 72/04    (2009.01)
H04W 52/24    (2009.01)
(Continued)

(52) U.S. Cl.
CPC ........... *H04W 72/0426* (2013.01); *H04L 5/14* (2013.01); *H04W 24/02* (2013.01);
(Continued)

(58) Field of Classification Search
None
See application file for complete search history.

(56) References Cited

U.S. PATENT DOCUMENTS

2008/0064432 A1 *  3/2008  Park .................. H04B 1/126
                                                   455/522
2009/0041151 A1    2/2009  Khan et al.
(Continued)

FOREIGN PATENT DOCUMENTS

EP    2418894 A1    2/2012
KR    2010-0111608 A    10/2010
(Continued)

OTHER PUBLICATIONS

International Search Report and Written Opinion received for corresponding Patent Cooperation Treaty Application No. PCT/FI2013/050505, dated May 11, 2012, 16 pages.
(Continued)

*Primary Examiner* — Christopher Crutchfield
*Assistant Examiner* — Tito Pham
(74) *Attorney, Agent, or Firm* — Squire Patton Boggs (US) LLP

(57) ABSTRACT

One embodiment is directed to a method for operating base stations in a heterogeneous network. The method may include receiving, by a first base station, an indication for a second base station to use flexible time division duplex mode (502), assessing an amount of interference that will be caused by the second base station (504)-(508), deciding how to adjust a transmission power of the second base station (509), and sending the second base station a request to adjust the transmission power (510).

18 Claims, 7 Drawing Sheets

(51) Int. Cl.
H04L 5/14 (2006.01)
H04W 24/02 (2009.01)
H04W 72/08 (2009.01)

(52) U.S. Cl.
CPC ..... *H04W 52/244* (2013.01); *H04W 72/0473* (2013.01); *H04W 72/085* (2013.01)

(56) References Cited

U.S. PATENT DOCUMENTS

| | | | |
|---|---|---|---|
| 2009/0042593 | A1 | 2/2009 | Yavuz et al. |
| 2010/0056177 | A1* | 3/2010 | Kojima ............... 455/456.1 |
| 2010/0097965 | A1* | 4/2010 | Kwon et al. ............... 370/294 |
| 2010/0189093 | A1 | 7/2010 | Palanki et al. |
| 2010/0322180 | A1 | 12/2010 | Kim et al. |
| 2011/0098055 | A1 | 4/2011 | Kwon et al. |
| 2011/0149813 | A1 | 6/2011 | Parkvall et al. |
| 2011/0201291 | A1 | 8/2011 | Suzuki et al. |
| 2011/0207499 | A1* | 8/2011 | Liu ............................. 455/522 |
| 2011/0243010 | A1* | 10/2011 | Geirhofer et al. ............ 370/252 |
| 2012/0020421 | A1 | 1/2012 | Larsson et al. |
| 2012/0039282 | A1 | 2/2012 | Kim et al. |
| 2012/0064904 | A1* | 3/2012 | Lee et al. ..................... 455/450 |
| 2012/0113843 | A1 | 5/2012 | Watfa et al. |

FOREIGN PATENT DOCUMENTS

| | | |
|---|---|---|
| WO | 2011100652 A1 | 8/2011 |
| WO | 2012034268 A1 | 3/2012 |
| WO | 2012040640 A1 | 3/2012 |

OTHER PUBLICATIONS

Yavus, M., et al, "Interference Manangement and Performance Analysis of UMTS/HSPA+Femtocells", IEEE Communications Magazine, vol. 47, pp. 102-109, 2009.

Wang et al., "Capacity Enhancement Using Reversed-Pair TDD Frame in OFDMA Femto-Cell Systems", IEEE 70th Vehicular Technology Conference Fall, Sep. 20-23, 2009, pp. 1-5.

Thai et al., "Interference Cancelation Schemes for Uplink Transmission in Femtocells", IEEE GLOBECOM Workshops, Dec. 6-10, 2010, 5 pages.

"3rd Generation Partnership Project; Technical Specification Group Radio Access Network; Evolved Universal Terrestrial Radio Access (E-UTRA); Physical layer procedures(Release 10)", 3GPP TS 36.213, V10.3.0, Sep. 2011, pp. 1-122.

International Search Report and Written Opinion received for corresponding Patent Cooperation Treaty Application No. PCT/FI2013/050506, dated Aug. 30, 2013, 16 pages.

"3rd Generation Partnership Project;Technical Specification Group Radio Access Network;Evolved Universal Terrestrial Radio Access (E-UTRA);Further enhancements to LTE Time Division Duplex (TDD)for Downlink-Uplink (DL-UL) interference management andtraffic adaptation (Release 11)", 3GPP TR 36.828, V11.0.0, Jun. 2012, pp. 1-109.

Extended European Search Report received for corresponding European Patent Application No. 13787061.4, dated Oct. 12, 2015, 8 pages.

"Performance Evaluation for LTE_TDD_elMTA in Multi-Cell Scenario", 3GPP TSG RAN WG1 Meeting #68bis, R1-121460, Agenda item: 7.10.1, LG Electronics, Mar. 26-30, 2012, pp. 1-5.

Extended European Search Report received for corresponding European Patent Application No. 13788217.1, dated Oct. 15, 2015, 7 pages.

European Office Action dated Jul. 12, 2016, issued in corresponding European Patent Application No. 13787061.4, 7 pages.

* cited by examiner

SET UP AND MAINTENANCE FRAMEWORK FOR FLEXIBLE TIME DIVISION DUPLEX OPERATION IN HETEROGENEOUS NETWORK

RELATED APPLICATION

This application was originally filed as Patent Cooperation Treaty Application No. PCT/FI2013/050505 filed May 7, 2013 which claims priority benefit to U.S. Provisional Patent Application No. 61/645844, filed May 11, 2012.

BACKGROUND

Field

Embodiments of the invention relate to wireless communications networks, such as a heterogeneous network (HetNet).

Description of the Related Art

In wireless communications, a heterogeneous network (HetNet) refers to a network where different types of nodes are participating in the communication. More specifically, HetNet scenarios in cellular communication systems are scenarios with different types of base stations (BSs). For example, besides the most common rooftop or mast-located macro BSs, a HetNet scenario in 3GPP may include deployment of small outdoor pico BSs and even smaller home (or femto) BSs.

Compared to macro BSs, the pico and femto BSs have lower transmission power—e.g. 3GPP defines maximum transmission power for pico BS and femto BS to stay within ±2 dB from a rated output power of 24 dBm and 20 dBm, respectively. These values are per carrier and correspond to a single antenna port—doubling the number of antenna ports, for example, reduces the limit by 3 dB. For a macro BS, the output power is limited by spectrum regulations; a typical value is 46 dBm. One purpose behind deployment of pico and femto BSs is to bring higher data rates to user equipment (UEs) that is connected to them, and to offload traffic from the macro BSs. However, interference between BSs may occur.

There are several scientific papers discussing interference management in femtocell networks. Although femto downlink power control (DLPC) has been applied to reduce interference to macro downlinks, femto DLPC has never been optimized in a cross-direction time division duplex (TDD) context.

There are two conference papers that discuss cross-direction macro/femto interference. The use of opposite-direction frame structure to enhance capacity is discussed in H. Wang and D. Hong, "Capacity Enhancement Using Reversed-Pair TDD Frame in OFDMA Femto-Cell Systems," *Vehicular Technology Conference Fall (VTC 2009-Fall)*, September, 2009 (hereinafter, "Capacity Enhancement"). A discussion of macro interference to femto uplink transmission is also discussed in C. That and P. Popovski, "Interference Cancelation Schemes for Uplink Transmission in Femtocells," *GLOBECOM Workshops (GC Wkshps)*, December, 2010 (hereinafter, "Interference Cancelation"). However, both papers propose to use interference cancellation via data sharing through a backhaul connection.

Discussion concerning controlling communication between a macro BS and a femto BS is provided in Kwon et al., US 2010/0097965 (hereinafter "Kwon"), and Kim et al., U.S. 2010/0322180 (hereinafter "Kim"). Kwon is directed to a femto BS measuring radio environment around itself and reporting to a macro BS, which responds with orders to the femto BS on how to organize its transmissions. Kim is similar, except that the BSs are specifically meant to exchange scheduling information.

SUMMARY

According to a first embodiment, a method can include receiving, by a first base station, an indication for a second base station to use flexible time division duplex mode. The method can also include assessing an amount of interference that will be caused by the second base station. The method can also include deciding how to adjust a transmission power of the second base station. The method can also include sending the second base station a request to adjust the transmission power.

In the method of the first embodiment, the sending comprises sending, by the first base station, a request to the second base station to set the transmission power of the second base station so that the second base station does not disturb uplink operations of the first base station beyond acceptable levels.

In the method of the first embodiment, the assessing comprises initiating and coordinating measurements, by the first base station, to determine the amount of interference.

In the method of the first embodiment, the assessing comprises ordering, by the first base station, a user equipment to conduct measurement of long-term channel conditions from a downlink transmission.

In the method of the first embodiment, the assessing comprises ordering, by the first base station, the second base station to conduct measurement of long-term channel conditions from a downlink transmission.

In the method of the first embodiment, the assessing comprises ordering, by the first base station, the second base station to transmit a reference signal so that the first base station can measure channel conditions.

In the method of the first embodiment, the deciding comprises comparing the amount of interference that will be caused by the second base station with an amount of interference due to neighboring cells.

In the method of the first embodiment, the method further includes receiving, by the first base station, an indication for a third base station to use flexible time division duplex mode. The method also includes assessing an amount of interference that will be caused by the third base station. The method also includes deciding how to adjust a transmission power of the third base station. The method also includes sending the third base station a request to adjust the transmission power. The first base station is a macro base station, the second base station is a femto base station, and the third base station is a femto base station.

In the method of the first embodiment, the second base station and the third base station each use different frame structures.

In the method of the first embodiment, the assessing comprises ordering, by the first base station, the second base station to use at least one user equipment associated with the second base station to transmit a reference signal, and the first base station determines the amount of interference based on the reference signal.

According to a second embodiment, an apparatus can include at least one processor. The apparatus can also include at least one memory including computer program code, the at least one memory and the computer program code are configured, with the at least one processor, to cause the apparatus at least to receive, by a first base station, an indication for a second base station to use flexible time division duplex mode. The apparatus can also assess an amount of interference that will be caused by the second base station. The apparatus can also decide how to adjust a transmission power of the second base station. The apparatus can also send the second base station a request to adjust the transmission power.

In the apparatus of the second embodiment, sending the second base station a request to adjust the transmission power comprises sending, by the first base station, a request to the second base station to set the transmission power of the second base station so that the second base station does not disturb uplink operations of the first base station beyond acceptable levels.

In the apparatus of the second embodiment, assessing an amount of interference comprises initiating and coordinating measurements, by the first base station, to determine the amount of interference.

In the apparatus of the second embodiment, assessing an amount of interference comprises ordering, by the first base station, a user equipment to conduct measurement of long-term channel conditions from a downlink transmission.

In the apparatus of the second embodiment, assessing an amount of interference comprises ordering, by the first base station, the second base station to conduct measurement of long-term channel conditions from a downlink transmission.

In the apparatus of the second embodiment, assessing an amount of interference comprises ordering, by the first base station, the second base station to transmit a reference signal so that the first base station can measure channel conditions.

In the apparatus of the second embodiment, deciding how to adjust a transmission power of the second base station comprises comparing the amount of interference that will be caused by the second base station with an amount of interference due to neighboring cells.

In the apparatus of the second embodiment, the apparatus is further caused to receive, by the first base station, an indication for a third base station to use flexible time division duplex mode. The apparatus is further caused to assess an amount of interference that will be caused by the third base station. The apparatus is also caused to decide how to adjust a transmission power of the third base station. The apparatus is also caused to send the third base station a request to adjust the transmission power. The first base station is a macro base station, the second base station is a femto base station, and the third base station is a femto base station.

In the apparatus of the second embodiment, the second base station and the third base station each use different frame structures.

In the apparatus of the second embodiment, assessing comprises ordering, by the first base station, the second base station to use at least one user equipment associated with the second base station to transmit a reference signal, and the first base station determines the amount of interference based on the reference signal.

According to a third embodiment, a computer program is embodied on a non-transitory computer readable medium, the computer program is configured to control a processor to perform a process. The process comprises receiving, by a first base station, an indication for a second base station to use flexible time division duplex mode. The process also includes assessing an amount of interference that will be caused by the second base station. The process also includes deciding how to adjust a transmission power of the second base station. The process also includes sending the second base station a request to adjust the transmission power.

According to fourth embodiment, a method comprises sending, to a first base station, an indication for a second base station to use flexible time division duplex mode. The method also includes receiving instructions from the first base station for adjusting a transmission power of the second base station. The method also includes adjusting the transmission power of the second base station in accordance with the instructions.

In the method of the fourth embodiment, the receiving comprises receiving, by the second base station, a request to set the transmission power of the second base station so that the second base station does not disturb uplink operations of the first base station beyond acceptable levels.

In the method of the fourth embodiment, the method can further comprise conducting measurement of long-term channel conditions from a downlink transmission.

In the method of the fourth embodiment, the method can also comprise transmitting a reference signal, by the second base station, so that the first base station can measure channel conditions.

In the method of the fourth embodiment, the method can also comprise receiving, from the first base station, an order for the second base station to use at least one user equipment associated with the second base station to transmit a reference signal. The method can also comprise using the at least one user equipment associated with the second base station to transmit the reference signal.

According to a fifth embodiment, an apparatus can comprise at least one processor; and at least one memory including computer program code, the at least one memory and the computer program code are configured, with the at least one processor, to cause the apparatus at least to send, to a first base station, an indication for a second base station to use flexible time division duplex mode. The apparatus can also receive instructions from the first base station for adjusting a transmission power of the second base station. The apparatus can also adjust the transmission power of the second base station in accordance with the instructions.

In the apparatus of the fifth embodiment, receiving instructions from the first base station for adjusting a transmission power of the second base station comprises receiving, by the second base station, a request to set the transmission power of the second base station so that the second base station does not disturb uplink operations of the first base station.

In the apparatus of the fifth embodiment, the apparatus can also conduct measurement of long-term channel conditions from a downlink transmission.

In the apparatus of the fifth embodiment, the apparatus can also transmit a reference signal, by the second base station, so that the first base station can measure channel conditions.

In the apparatus of the fifth embodiment, the apparatus can also receive, from the first base station, an order for the second base station to use at least one user equipment associated with the second base station to transmit a reference signal. The apparatus can also use the at least one user equipment associated with the second base station to transmit the reference signal.

According to a sixth embodiment, a computer program is embodied on a non-transitory computer readable medium, the computer program is configured to control a processor to perform a process. The process comprises sending, to a first base station, an indication for a second base station to use flexible time division duplex mode. The process can also include receiving instructions from the first base station for adjusting a transmission power of the second base station.

The process can also include adjusting the transmission power of the second base station in accordance with the instructions.

According to a seventh embodiment, a system can comprise a first apparatus. The first apparatus can comprise at least one first processor. The first apparatus can also comprise at least one first memory including first computer program code, the at least one first memory and the first computer program code are configured, with the at least one first processor, to cause the first apparatus at least to receive, by a first base station, an indication for a second base station to use flexible time division duplex mode. The first apparatus can also assess an amount of interference that will be caused by the second base station. The first apparatus can also decide how to adjust a transmission power of the second base station. The first apparatus can also send the second base station a request to adjust the transmission power. The system can also include a second apparatus. The second apparatus can comprise at least one second processor. The second apparatus can also include at least one second memory including second computer program code, the at least one second memory and the second computer program code are configured, with the at least one second processor, to cause the second apparatus at least to send, to the first base station, the indication for the second base station to use flexible time division duplex mode. The second apparatus can also receive instructions from the first base station for adjusting the transmission power of the second base station. The second apparatus can also adjust the transmission power of the second base station in accordance with the instructions.

According to an eighth embodiment, an apparatus can include receiving means to receive, by a first base station, an indication for a second base station to use flexible time division duplex mode. The apparatus can also include assessing means to assess an amount of interference that will be caused by the second base station. The apparatus can also include deciding means to decide how to adjust a transmission power of the second base station. The apparatus can also include sending means to send the second base station a request to adjust the transmission power.

According to a ninth embodiment, an apparatus can comprise sending means to send, to a first base station, an indication for a second base station to use flexible time division duplex mode. The apparatus can also include receiving means to receive instructions from the first base station for adjusting a transmission power of the second base station. The apparatus can also include adjusting means to adjust the transmission power of the second base station in accordance with the instructions.

According to a tenth embodiment, a system can comprise a first apparatus. The first apparatus can comprise receiving means to receive, by a first base station, an indication for a second base station to use flexible time division duplex mode. The first apparatus can also include assessing means to assess an amount of interference that will be caused by the second base station. The first apparatus can also include deciding means to decide how to adjust a transmission power of the second base station. The first apparatus can also include sending means to send the second base station a request to adjust the transmission power. The system can also include a second apparatus. The second apparatus can include sending means to send, to the first base station, the indication for the second base station to use flexible time division duplex mode. The second apparatus can also include receiving means to receive instructions from the first base station for adjusting the transmission power of the second base station. The second apparatus can also include adjusting means to adjust the transmission power of the second base station in accordance with the instructions.

BRIEF DESCRIPTION OF THE DRAWINGS

For a proper understanding of the invention, reference should be made to the accompanying drawings, wherein.

DETAILED DESCRIPTION

Figure 1:
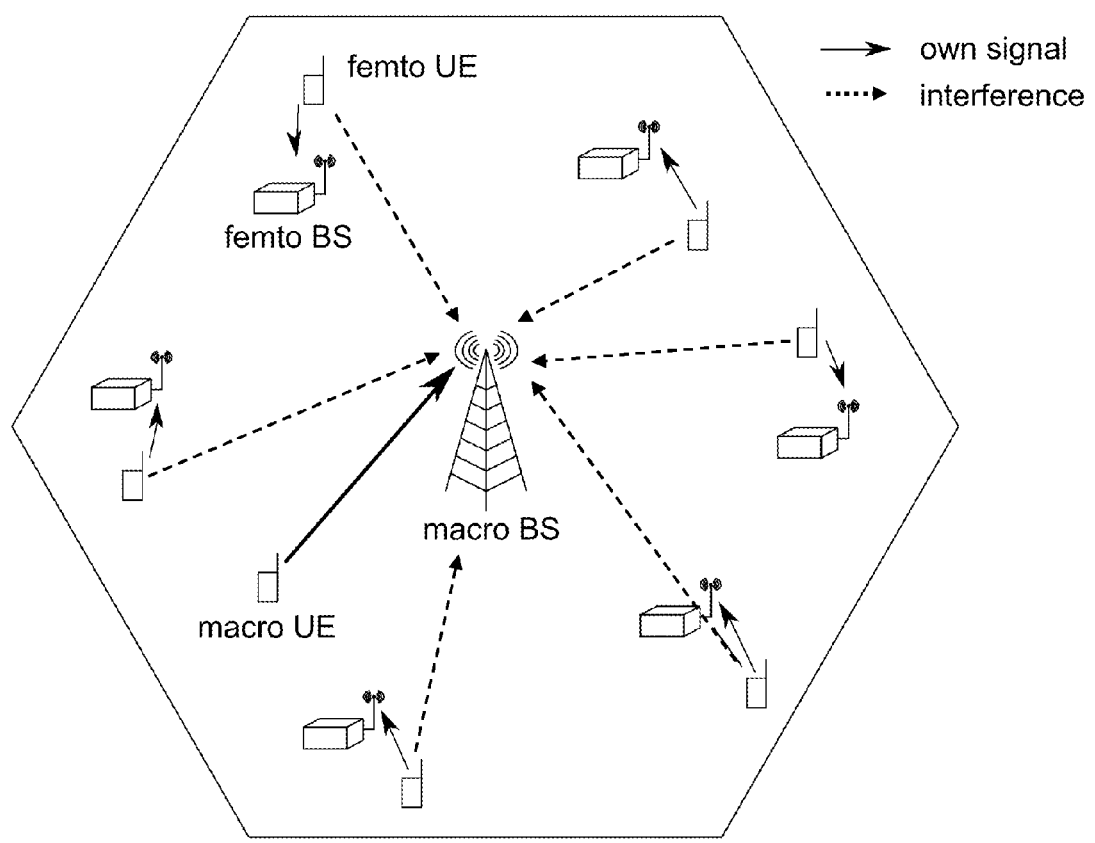
FIG. 1 illustrates a scenario, according to one embodiment, where both macro and femto BSs are in an uplink mode.

It will be readily understood that the components of the invention, as generally described and illustrated in the figures herein, may be arranged and designed in a wide variety of different configurations. Thus, the following detailed description of the embodiments of a system, a method, an apparatus, and a computer program product for operating base stations as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings, and embodiments of this invention, and not in limitation thereof.

One embodiment of the invention relates to macro BSs and femto BSs operating in time division duplex (TDD) mode. The base stations may be able to adjust their frame structures flexibly, i.e., without assumption of a same frame structure being used by all BSs in a certain area. Mechanisms supporting flexible TDD frame structures are being studied in 3GPP LTE at the moment, as discussed in "Further Enhancements to LTE TDD for DL-UL Interference Management and Traffic Adaptation."

A TDD system may allow the BSs to set the transmission direction (uplink (UL) or downlink (DL)) so that the transmission direction reflects the traffic needs of the connected UEs. For example, if there is stronger demand for DL data, the BS may assign more time for downlink transmission and less time for uplink transmission. In Long Term Evolution (LTE), the minimum re-configuration time of the TDD frame structure is around 640 ms, but 3GPP is currently studying the feasibility of more dynamic re-configurations up to 10 ms time scale, as well as independent TDD frame structure configurations for different nodes in the network.

Flexible TDD operation may be superior to fixed or slowly varying TDD operation in cases where the BS has a low amount of connected UEs, as observed in 3GPP Study Item on "Further Enhancements to LTE TDD for DL-UL Interference Management and Traffic Adaptation." These circumstances correspond with the circumstances encountered by femto BSs and to some extent also by pico BSs. Therefore, the situation where smaller cells with femto BSs or pico BSs are in downlink mode while a macro BS is in uplink mode is relevant for future networks that support flexible TDD switching points.

One difference between femto BSs and other cellular BSs is that the former may be placed and operated by users themselves and therefore cannot be accounted for during frequency and site planning. Consequently, any interference that appears between femto BSs and other BSs may need to be solved by means other than frequency and site planning. Pico and other types of small BSs can be present in the scenario as well. Although pico and other types of small BSs may be accounted for during frequency and site planning, embodiments of this invention can apply to them as well.

An example of an interference mitigation concept is TDM eICIC (Time Domain enhanced Inter-Cell Interference Coordination), in which at least one of the BSs may not transmit data channels during some time intervals in order to reduce interference caused to co-located UEs that are associated to a different BS. TDM eICIC is standardized within 3GPP and may require the BSs in a certain area to be time-synchronized, including macro BSs and femto BSs.

During flexible TDD operation, it is possible that one link is in uplink mode and another link is in downlink mode. This leads to so called cross-direction interference. For example, if a macro UE—macro BS link is in uplink mode and a femto UE—femto BS link is in downlink mode, there may be cross-direction interference from the femto BS to the macro BS and from the macro UE to the femto UE.

In particular, an interference situation may arise when one or more femto BSs are in downlink mode and a co-located macro BS is in uplink mode. Due to uplink power control (ULPC) and short distances between a femto BS and femto UE, transmission power of the femto BS can be significantly higher than that of a femto UE. This means that, without power control in femto DL, interference from a femto layer in DL mode may be significantly stronger than interference from a femto layer in UL mode. The situation is illustrated in FIG. 1 and FIG. 2.

FIG. 1 illustrates a scenario, according to one embodiment, where both macro and femto BSs are in uplink mode. In this scenario, the femto UEs have low transmission power because they are close to their femto BSs. In this scenario, the femto layer does not cause significant interference to the macro uplink. The thicker line from the macro UE to the macro BS illustrates that the signal is potentially stronger.

Figure 2:
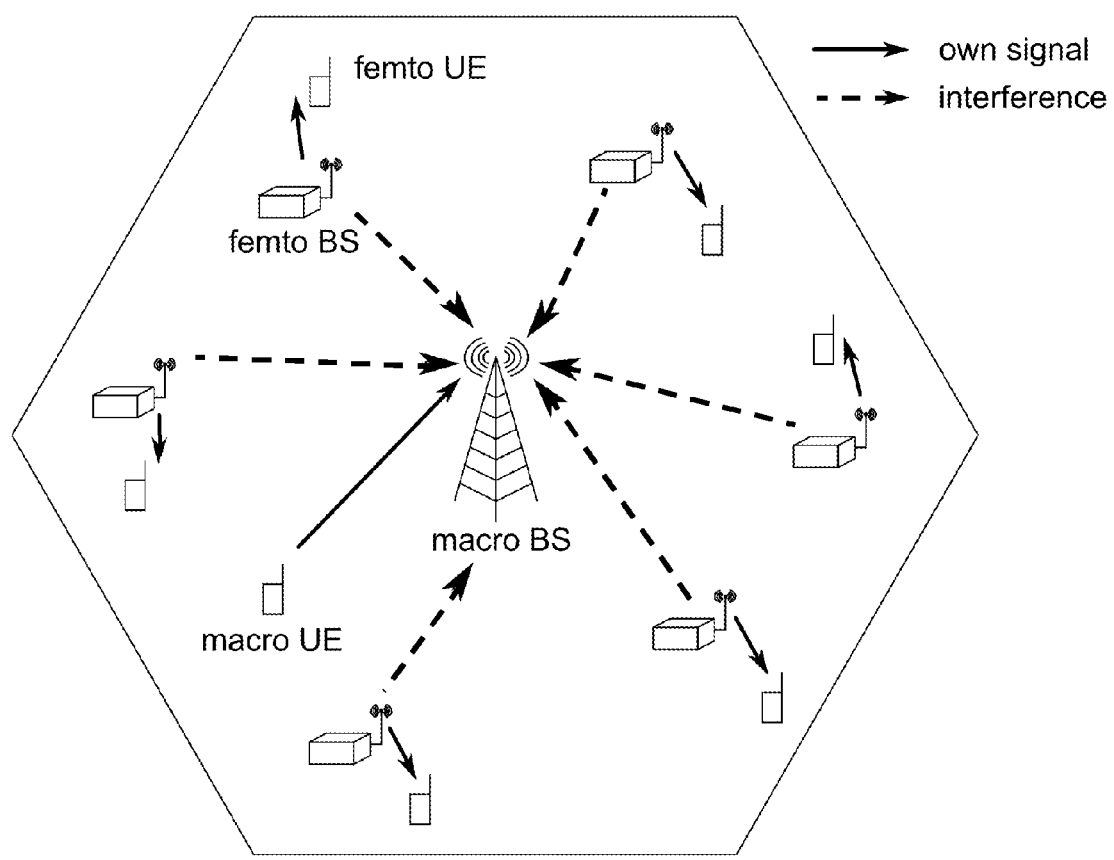
FIG. 2 illustrates a scenario, according to one embodiment, where a macro BS is in an uplink mode and femto BSs are in a downlink mode.

However, FIG. 2 illustrates a scenario, according to one embodiment, where a macro BS is in uplink mode and femto BSs are in downlink mode. The transmission power of the femto BSs is high, because the femto downlinks are not, by default, power controlled. With enough femto BSs in downlink mode, the macro uplink can therefore suffer from significant interference.

Figure 3:
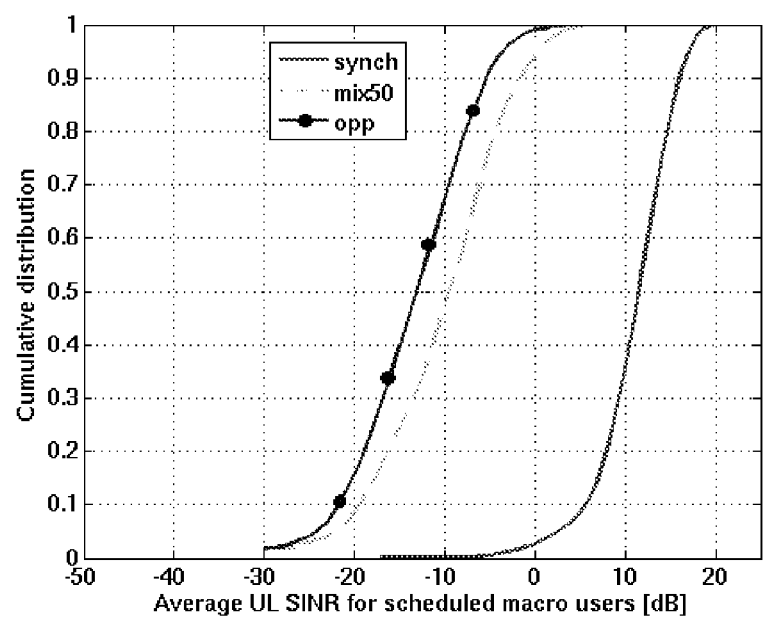
FIG. 3 illustrates results from a system level simulator according to one embodiment.

FIG. 3 shows a signal-to-interference-plus-noise-ratio (SINR) of macro UEs in UL under different types of femtocell interference, according to one embodiment. The solid-line curve (synchronous case) corresponds to when all femtocells are in UL mode, the spotted-line curve (opposite case) corresponds to when all femtocells are in DL mode, and the broken-line curve (mix case) corresponds to when 50% of femtocells are in UL mode and 50% are in DL mode.

The results show that the SINR can drop to very low values when femtocells are in DL or mixed mode. The simulation settings are based on a 3GPP HetNet scenario, where a hexagonal macro sector has in its coverage two six-floor buildings with 24 randomly located femtocells.

The interference from femto BSs may be limited by applying downlink power control (DLPC). However, in order to maximize femto BS coverage and spectrum efficiency, it may be desirable to apply more substantial DLPC at times when a macro BS is in uplink mode, otherwise the femto downlink itself may suffer from strong interference coming from the macro BS. In a frame structure where some subframes are reserved for downlink and others reserved for uplink, there is a possibility of adjusting femto DLPC on a subframe basis.

However, it may not be obvious how strict the DLPC needs to be. If there are only a few femtocells within a macrocell range, or if they are far away from the macro BS, the reduction of femto BS transmission power may not need to be aggressive. On the other hand, simulation results show that, with many femtocells, the transmission power may need to be reduced by ~20 dB or more.

If a macro BS detects interference but does not recognize that that the interference is TDD interference, the macro BS may incorrectly assume that the interference is caused by the uplink of neighboring macro BSs. The affected macro BS may unnecessarily ask the neighboring macro BSs to reduce the macro UEs' transmission power. To avoid this unnecessary reduction in transmission power, femto BSs may inform a macro BS about the possibility of TDD interference. As a result, the macro BS will not incorrectly try to reduce TDD interference by merely addressing neighboring macro BSs.

Certain embodiments of the invention function to reduce transmission power in a feasible and efficient manner. Certain embodiments of the invention enable a flexible TDD approach to be used without harming macro UL transmission more than can be tolerated by the macro BS. It should be noted that advantages of the present invention are not limited to those discussed above and other advantages may be realized according to embodiments of the invention.

In view of the above, in one embodiment, a setup/maintenance framework allows a network comprising macro BSs and femto BSs to measure and communicate DLPC parameters (e.g. the necessary power reduction from default Tx power or parameters for any new DLPC mechanism equation) for femto BSs so that the network can withstand cross-direction interference caused by operations using flexible TDD mode. A macro BS can coordinate the femto DL power control on subframes which are not following the same UL/DL configuration as the macro BS.

For example, certain embodiments of the invention may include some or all of the following steps during a setup/maintenance phase:

1) The femto BS that plans to use flexible TDD mode informs the macro BS about this intention.
2) The macro BS then initiates and coordinates measurements that will determine the necessary DLPC parameters. The macro BS may have to gain knowledge about long-term channel conditions between itself and the femto BSs. For example, this can be achieved in several ways:
    The femto BSs may measure the channel conditions from a macro BS downlink transmission and report the information to the macro BS.
    The macro BS may order the femto BSs to use corresponding femto UEs to transmit a reference/beacon signal that will allow the macro BS to measure a condition of a channel that is expected to be similar to the femto BS—macro BS channel.

The femto UEs may measure the channel conditions (expected to be similar to the BS-to-femto BS channel) and report the information to the macro BS, possibly via the femto BSs or directly to the macro BS.

The macro BS may order the femto BSs to transmit a reference/beacon signal that will allow the macro BS to measure the channel condition by itself.

In case there are multiple flexible TDD femto BSs within the macro BS coverage, the macro BS can coordinate the measurements in such a way that it gains as much information about the interference caused by each particular femto BS as possible.

3) Based on the measurements, the macro BS may then decide which femto BSs need to apply DLPC in their flexible TDD subframes. It may also determine parameters of the DLPC, i.e. to what extent each given femto BS must reduce its transmission power.

4) The macro BS may then send the required DLPC parameters to corresponding femto BSs. Femto BSs are obligated to abide by the decision.

Figure 4:
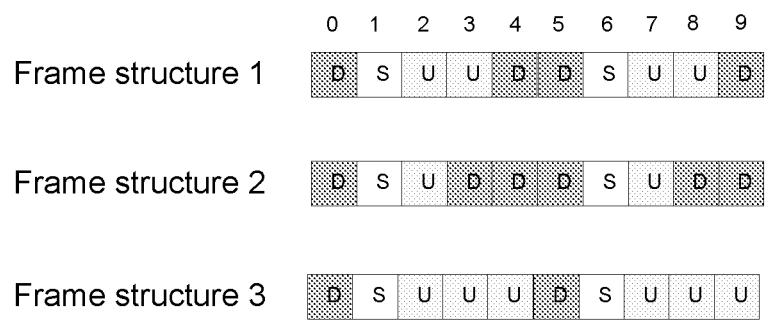
FIG. 4 illustrates sample frame structures according to one embodiment.

A cellular wireless system in TDD mode can have several frame structures to choose from. For example, FIG. 4 illustrates a sample system, according to one embodiment, that may have three possible frame structures. D stands for a downlink subframe, U stands for an uplink subframe, and S stands for a special subframe.

Referring to FIG. 4, frame structure 1 has an equal number of downlink and uplink subframes, frame structure 2 has more downlink subframes, and frame structure 3 has more uplink subframes. Subframes 0, 1, and 2 are always the same in all base stations, and there is no cross-direction interference present in them, as well as no cross-direction interference present in subframes 5, 6, and 7. Subframes 3, 4, 8, and 9 can then be referred to as flexible subframes, because by setting the corresponding frame structure, a BS can adapt its transmission order according to traffic characteristics.

To be more specific, a BS with balanced UL and DL traffic and/or higher number of connected UEs would choose frame structure 1. On the other hand, a BS with noticeably more DL traffic than UL traffic can benefit from frame structure 2, while a BS with noticeably more UL traffic can benefit from frame structure 3. As previously mentioned, macro BSs may be expected to use a balanced frame structure (i.e., frame structure 1 in our sample case), while femto BSs would use a frame structure that fits best with their traffic characteristics (i.e., frame structure 1, 2, or 3).

In view of the above, and assuming that the network is time synchronized (which is typically assumed in a TDD system), a problematic interference scenario may occur in subframes 3 and 8 when one or more femto BSs (within the coverage area of a macro BS) use frame structure 2. In order to make the macro UL transmission in subframes 3 and 8 viable, femto DL transmission power may need to be reduced. In subframes 4 and 9, the femto DLPC can be less substantial because, in those subframes, the macro BS is in the DL direction where it causes higher interference than during UL direction.

In cases where the macro BS changes its frame structure, the scope of the setup/maintenance framework will change accordingly. For example, assuming that femto BS uses frame structure 2, with a macro BS using frame structure 2, there may be no need for a subframe-specific DLPC, while with a macro BS using frame structure 3, the DLPC may need to be adjusted in subframes 3, 4, 8, and 9. The macro frame structure may be broadcast in PBCH, and may otherwise be informed directly to the FemtoBS using, e.g. an X2 interface.

In order to correctly configure the parameters of femto DLPC in the problematic subframes (e.g. subframes 3 and 8 in the case when macro BS uses frame structure 1 and femto BS uses frame structure 2), one embodiment may be a setup/maintenance framework with several steps:

1) Request to use flexible TDD mode. Message direction: from femto BS to macro BS.

In the first step, the femto BS may send a message to the overlay macro BS indicating that it intends to operate in flexible TDD mode. Based on knowledge of the allowed frame structures, the macro BS deduces in which UL subframes it can expect cross-direction interference from the given femto BS. If the femto BS does not initiate the setup/maintenance phase, the macro BS could assume that the strong interference comes from UL in neighboring macro-cells, which may lead to sub-optimal radio resource management.

2) Initiation and coordination of measurements

When the macro BS finds out that there is one or more femto BSs that are going to operate in flexible TDD mode, it may need to assess how much interference would be generated by the femto DL. Interference from a single femto BS that is blocked by multiple walls may be negligible, but multiple femto BSs and/or placement with little obstructions between the femto BS and the macro BS may lead to strong interference.

To assess the level of interference, the macro BS may initiate and coordinate measurements so that it may learn how substantial the interference from the femto BSs is.

In one embodiment, the macro BS may order the femto BSs to conduct measurement of long-term channel conditions from a macro DL transmission. In the 3GPP standard, this can be done by measuring reference signal received power (RSRP) by a UE receiver. The femto BSs may be expected to have a compatible receiver (HeNB sniffer) in order to perform Network Listen Mode measurements. Once the femto BSs have measured the channel condition, they will report it back to the macro BS. This embodiment may not require additional hardware at the BSs or UEs, and it may not require the UEs to be involved in a measurement procedure between macro and femto BSs.

In another embodiment, the macro BS may order the femto BSs to make the femto UEs transmit a reference/beacon signal, so that the macro BS can measure the channel conditions from them. Long-term channel conditions from the femto UEs may be expected to be similar to those from the corresponding femto BSs. In the 3GPP LTE context, the femto UE can use UL reference signals or Random Access Channel (RACH) for this purpose. For example, if measurements are based on Sounding Reference Signals (SRS) from femto UEs, it may be enough that the macro BS knows the sequences in use by the femto UEs, and the subframes where SRS transmissions are taking place. This information can be shared, e.g. in an X2 interface or groups of sequences can be defined for each cell during a network planning phase. This embodiment can be transparent to femto UEs and may not require extra SRS transmissions.

In another embodiment, RSRP measurements may be conducted by femto UEs and reported to a macro BS (possibly via corresponding femto BSs). This embodiment may be used in case the femto BSs are not equipped with a DL receiver. Although the measured channel is different from the required BS-to-BS channel, the long-term conditions may be expected to be similar.

In another embodiment, the macro BS may order the femto BSs to transmit a reference/beacon signal and measure the channel conditions itself. In a 3GPP LTE compliant system, this may require an OFDMA receiver at the macro BS, or a SC-FDMA transmitter at the femto BS.

By organizing the measurements from multiple femto BSs in a smart way, the macro BS can acquire any required level of interference awareness. For example, if there are two femto BSs, the macro BS may request them to send reference signals in different time/code/frequency instances, or in the same instance, depending on what interference needs to be estimated.

3) Calculation of the required femto DLPC settings. Place: macro BS.

In the third step, the macro BS processes the measured channel conditions. The information can be compared with signal powers coming from connected macro UEs and/or UL interference from neighboring macrocells and may be necessary to decide how the femto BSs should adjust their transmission power so that the macro UL is not significantly disturbed. For example, if the sum interference from femto BSs is noticeably stronger than interference in synchronous UL subframes, the macro BS can request the femto BSs to reduce their Tx powers by a constant fraction of the difference, so that the corrected interference levels are approximately the same. Or, in case the macro BSs knows interference contributions from individual femto BSs, it can request those femto BSs that are causing more interference to decrease their Tx power more substantially than others.

4) Request to configure DLPC. Message direction: from macro BS to femto BS.

In the last step, the macro BS sends the femto BS a request to set its transmission power so that it does not disturb macro UL operation. The value of transmission power reduction may depend on the measurements from the previous step. The femto BS may only be allowed to transmit in the flexible subframes if it complies with the request from the macro BS.

Steps 1, 2 and 4 may require communication between the macro BS and the femto BS. Although such a link may be, by default, not available, there are several ways to achieve such a link. The presence of an X2 interface may not be guaranteed, therefore, it can be used only in some cases. In other cases, the communication can be done directly over-the-air, or by using a femto UE as a relay. The over-the-air option from macro BS to femto BS can take advantage of the presence of a UE compatible receiver in a femto BS. In the opposite direction from femto BS to macro BS, it may not be so straightforward, as it may require an OFDMA receiver at the macro BS or SC-FDMA transmitter at the femto BS. In that case, it may be more sensible to use a femto UE as a relay. For certain embodiments described above, the same femto UEs that took part in the measurements can be used for relaying information from femto BS to macro BS.

Figure 5A:
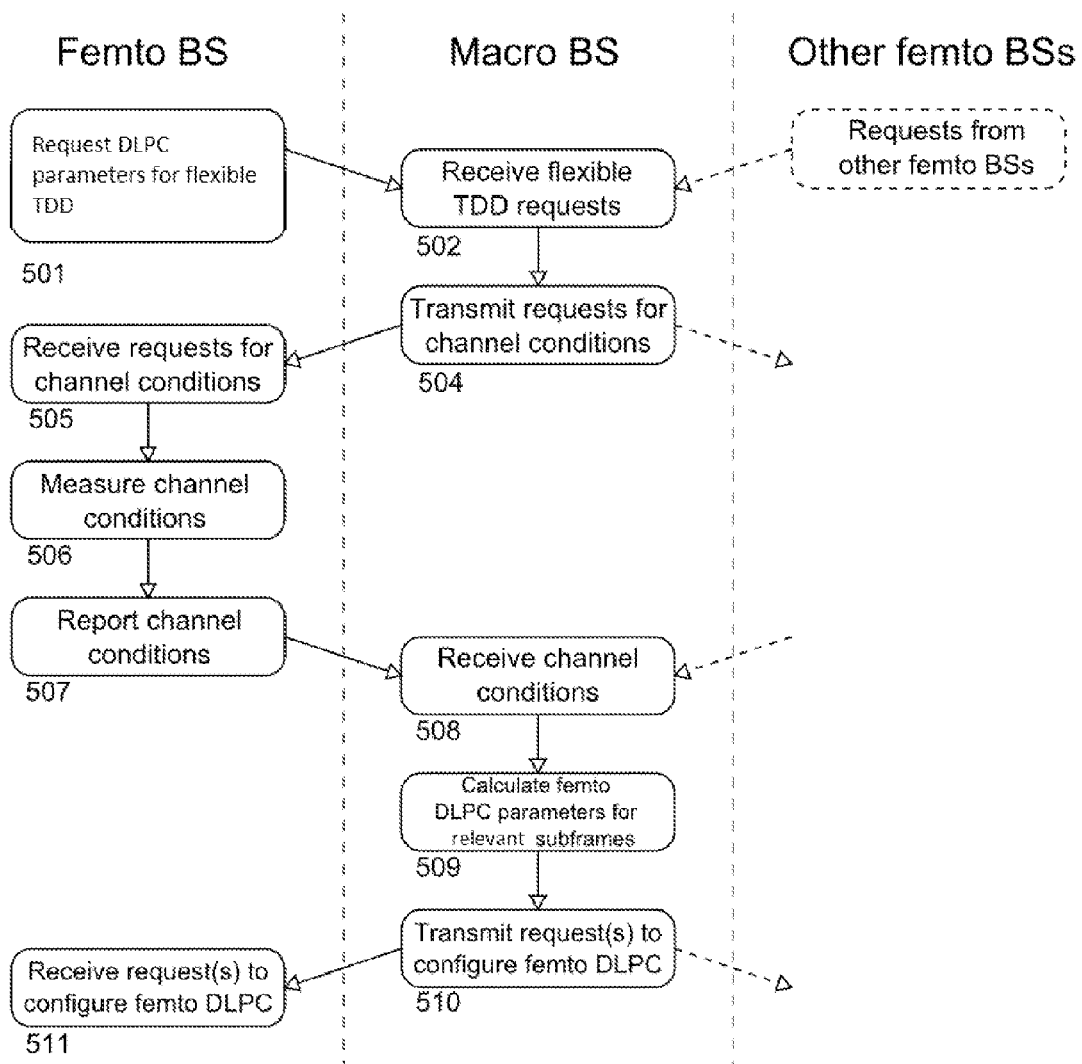
FIG. 5A illustrates a flowchart of a method according to one embodiment.

FIG. 5A is a flowchart, according to one embodiment, of an example setup/maintenance framework. The functionality is mostly described in a case of a single femto BS, but applies accordingly also in cases of multiple femto BSs, as depicted by the dashed arrows. In step 505, the femto BS uses the available DL receiver to measure RSRP from the macro BS. In some embodiments, in 501 and 507, the femto BS uses a femto UE as a relay to send requests and reports to the macro BS, while, in other embodiments, the femto BS communicates directly with the macro BS, for example via X2 interface. In some embodiments, 501 may be a request by the femto BS to use flexible TDD mode. In other embodiments, 501 may be a request by the femto BS to revisit power control parameters (e.g. the femto BS may have limited capacity in DL and would like to increase operating power). In 504 and 510, the macro BS can use a standard DL transmission and the femto BS can again receive it by the available DL receiver. The flowchart depicts one embodiment of the measurement setup—for other cases there could be an extra step for planning the order of requests/beacons, and the steps from 504 to 508 would change according to the written description. In embodiments where 501 may be a request by the femto BS to revisit power control parameters, the process may complete steps 504-508 or may simply revisit the computation against available information, in which case the process would skip directly to step 509.

Figure 5B:
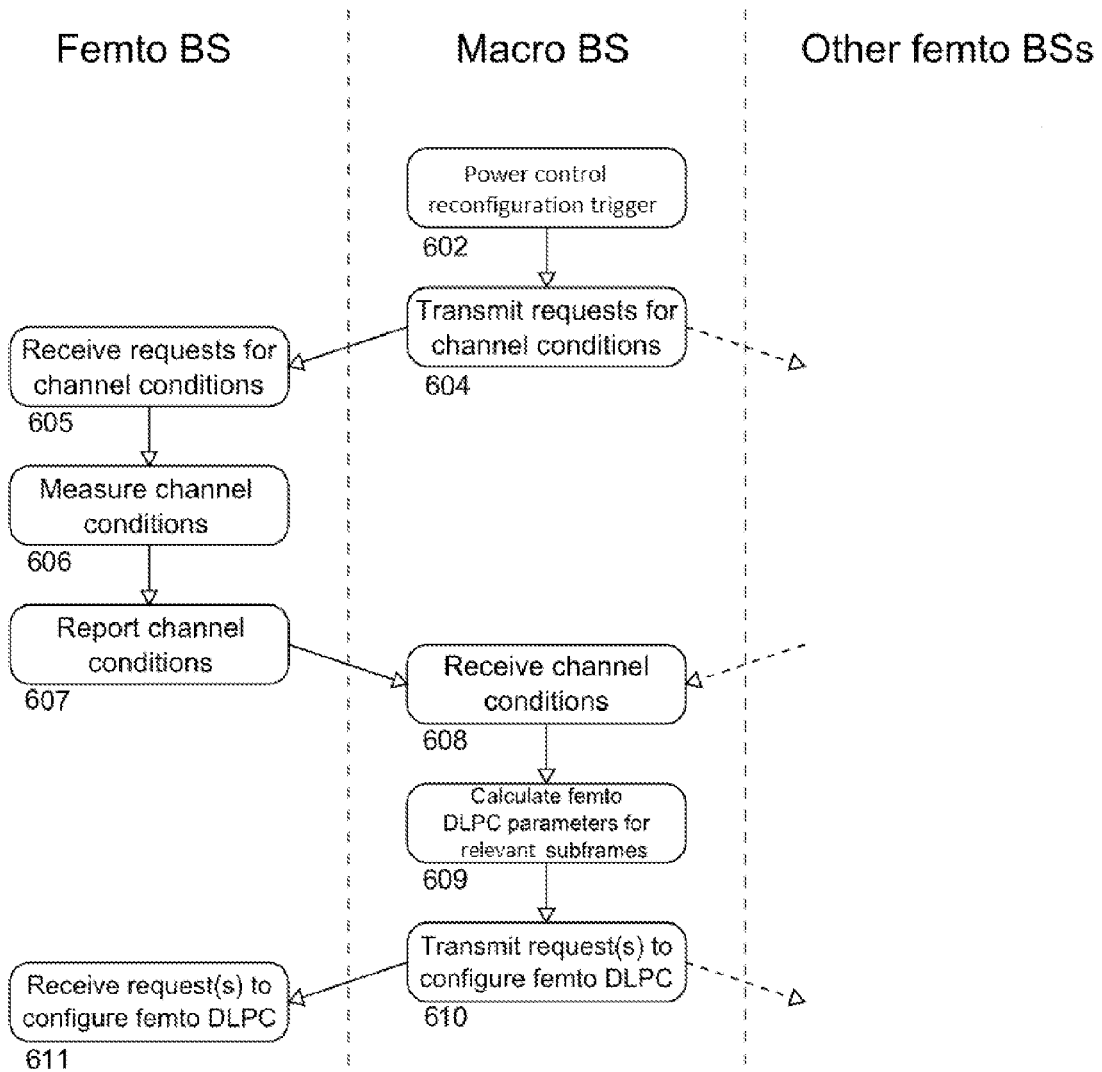
FIG. 5B illustrates a flowchart of a method according to another embodiment.

FIG. 5B is a flowchart, according to one embodiment, of an example setup/maintenance framework. The functionality is mostly described in a case of a single femto BS, but applies accordingly also in cases of multiple femto BSs, as depicted by the dashed arrows. In some embodiments, 602 may be triggered by a macro BS itself if the macro BS identifies problems with, for example, UL performance and wants to confirm if power control from the femto BSs is correctly parameterized. In some embodiments, 602 may be triggered by the macro BS itself if the macro BS wants to change its TDD configuration. In step 605, the femto BS uses the available DL receiver to measure RSRP from the macro BS. In some embodiments, in 607, the femto BS uses a femto UE as a relay to send requests and reports to the macro BS, while, in other embodiments, the femto BS communicates directly with the macro BS, for example via X2 interface. In 604 and 610, the macro BS can use a standard DL transmission and the femto BS can again receive it by the available DL receiver. The flowchart depicts one embodiment of the measurement setup—for other cases there could be an extra step for planning the order of requests/beacons, and the steps from 604 to 608 would change according to the written description. In embodiments where 602 may be a request by the macro BS to change its TDD configuration, the process may skip to 609-611 if the macro BS trusts the current channel state information from the femto BSs.

In some embodiments, the macro BS may not be present or it may not operate in the same carrier as the femto BS, in which case there is still a need to coordinate interference between the small cells. In such embodiments, steps 502, 504, 508, 509, and 510 in FIG. 5A, and steps 602, 604, 608, 609, and 610 in FIG. 5B can be executed by a network node which is coordinating the power control parameters of femto BS in a certain area, for example a macro BS in a separate carrier or one of the femto BS in the area.

Figure 6:
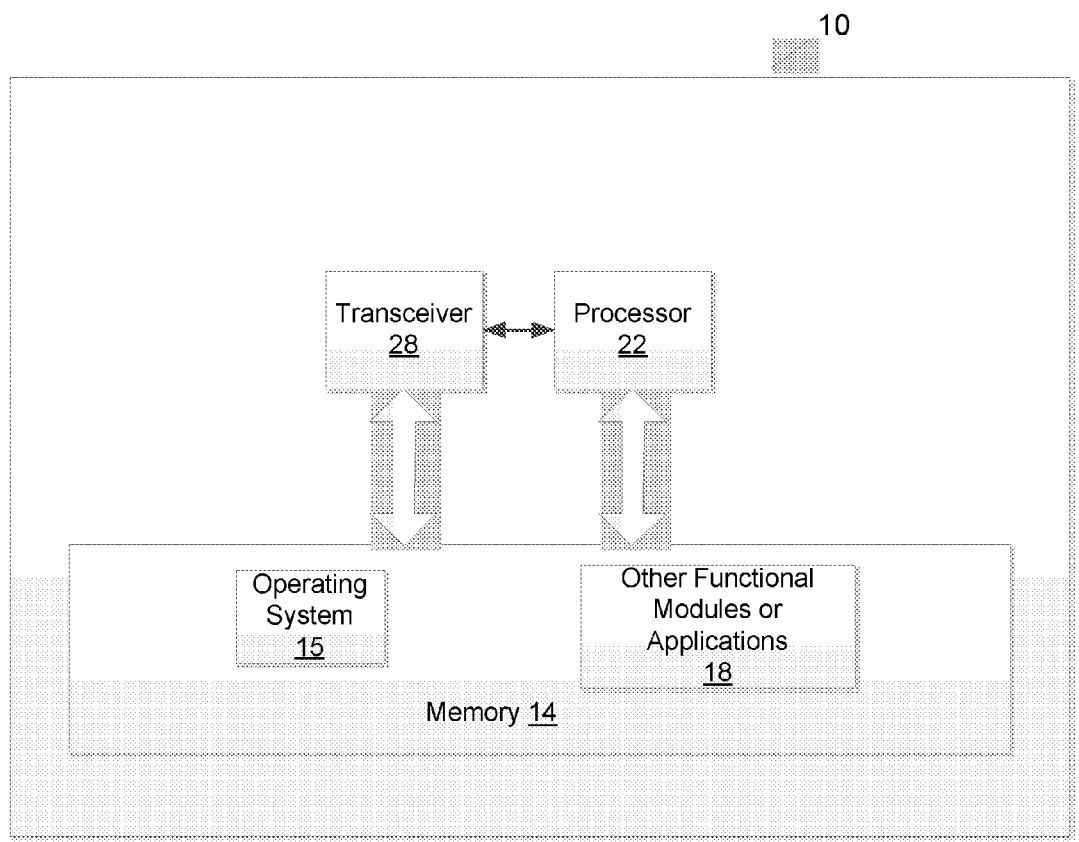
FIG. 6 illustrates an apparatus according to one embodiment.

FIG. 6 illustrates an apparatus 10 according to another embodiment. In an embodiment, apparatus 10 may be a macro BS. In other embodiments, apparatus 10 may be a pico BS, femto BS, or any other BS.

Apparatus 10 includes a processor 22 for processing information and executing instructions or operations. Processor 22 may be any type of general or specific purpose processor. While a single processor 22 is shown in FIG. 6, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

In view of the above, one embodiment is directed to a method. The method may include receiving, by a first base station, a request for a second base station to use flexible time division duplex mode, assessing an amount of interference that will be caused by the second base station, deciding how to adjust a transmission power of the second base station, and sending the second base station a request to adjust the transmission power.

Another embodiment is directed to an apparatus including at least one processor and at least one memory including computer program code. The at least one memory and the computer program code are configured, with the at least one processor, to cause the apparatus at least to receive, a request for a base station to use flexible time division duplex mode, assess an amount of interference that will be caused by the base station, decide how to adjust a transmission power of the base station, and send the base station a request to adjust the transmission power.

Another embodiment is directed to a computer program embodied on a computer readable medium. The computer program is configured to control a processor to perform a process. The process may include receiving, by a first base station, a request for a second base station to use flexible time division duplex mode, assessing an amount of interference that will be caused by the second base station, deciding how to adjust a transmission power of the second base station, and sending the second base station a request to adjust the transmission power.

Another embodiment is directed to a method. The method may include sending, to a first base station, a request for a second base station to use flexible time division duplex mode, receiving instructions from the first base station for adjusting a transmission power of the second base station, and adjusting the transmission power of the second base station in accordance with the instructions.

Another embodiment is directed to an apparatus including at least one processor and at least one memory including computer program code. The at least one memory and the computer program code are configured, with the at least one processor, to cause the apparatus at least to send, to a base station, a request to use flexible time division duplex mode, receive instructions from the base station for adjusting a transmission power, and adjust the transmission power in accordance with the instructions.

Another embodiment is directed to a computer program embodied on a computer readable medium. The computer program is configured to control a processor to perform a process. The process may include sending, to a first base station, a request for a second base station to use flexible time division duplex mode, receiving instructions from the first base station for adjusting a transmission power of the second base station, and adjusting the transmission power of the second base station in accordance with the instructions.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising:
    at least one processor; and
    at least one memory including computer program code,
        the at least one memory and the computer program code are configured, with the at least one processor, to cause the apparatus at least to receive, by a first base station, an indication for a second base station to use flexible time division duplex mode, which at least partially causes cross-link interference, before the second base station transmits using the flexible time division duplex mode;

assess an amount of the cross-link interference that will be caused by the second base station;

decide how to adjust a transmission power of the second base station based on the cross-link interference; and send the second base station a request to adjust the transmission power in order to reduce the cross-link interference.

2. The apparatus according to claim 1, wherein sending the second base station a request to adjust the transmission power comprises sending, by the first base station, a request to the second base station to set the transmission power of the second base station so that the second base station does not disturb uplink operations of the first base station beyond acceptable levels.

3. The apparatus according to claim 1, wherein assessing an amount of interference comprises initiating and coordinating measurements, by the first base station, to determine the amount of interference.

4. The apparatus according to claim 1, wherein assessing an amount of interference comprises ordering, by the first base station, a user equipment to conduct measurement of long-term channel conditions from a downlink transmission.

5. The apparatus according to claim 1, wherein assessing an amount of interference comprises ordering, by the first base station, the second base station to conduct measurement of long-term channel conditions from a downlink transmission.

6. The apparatus according to claim 1, wherein assessing an amount of interference comprises ordering, by the first base station, the second base station to transmit a reference signal so that the first base station can measure channel conditions.

7. The apparatus according to claim 1, wherein deciding how to adjust a transmission power of the second base station comprises comparing the amount of interference that will be caused by the second base station with an amount of interference due to neighboring cells.

8. The apparatus according to claim 1, wherein the apparatus is further caused to receive, by the first base station, an indication for a third base station to use flexible time division duplex mode;

assess an amount of interference that will be caused by the third base station;

decide how to adjust a transmission power of the third base station; and send the third base station a request to adjust the transmission power, wherein the first base station is a macro base station, the second base station is a femto base station, and the third base station is a femto base station.

9. The apparatus according to claim 1, wherein the second base station and the third base station each use different frame structures.

10. The apparatus according to claim 1, wherein the assessing comprises ordering, by the first base station, the second base station to use at least one user equipment associated with the second base station to transmit a reference signal, and the first base station determines the amount of interference based on the reference signal.

11. A computer program embodied on a non-transitory computer readable medium, the computer program configured to control a processor to perform a process, the process comprising:

receiving, by a first base station, an indication for a second base station to use flexible time division duplex mode, which at least partially causes cross-link interference, before the second base station transmits using the flexible time division duplex mode;

assessing an amount of the cross-link interference that will be caused by the second base station;

deciding how to adjust a transmission power of the second base station based on the cross-link interference; and sending the second base station a request to adjust the transmission power in order to reduce the cross-link interference.

12. An apparatus, comprising:

at least one processor; and at least one memory including computer program code, the at least one memory and the computer program code are configured, with the at least one processor, to cause the apparatus at least to send, to a first base station, an indication for a second base station to use flexible time division duplex mode, which at least partially causes cross-link interference, before the second base station transmits using the flexible time division duplex mode;

receive instructions from the first base station for adjusting a transmission power of the second base station based on the cross-link interference; and adjust the transmission power of the second base station in accordance with the instructions in order to reduce the cross-link interference.

13. The apparatus according to claim 12, wherein receiving instructions from the first base station for adjusting a transmission power of the second base station comprises receiving, by the second base station, a request to set the transmission power of the second base station so that the second base station does not disturb uplink operations of the first base station.

14. The apparatus according to claim 12, the apparatus further caused to conduct measurement of long-term channel conditions from a downlink transmission.

15. The apparatus according to claim 12, the apparatus further caused to transmit a reference signal, by the second base station, so that the first base station can measure channel conditions.

16. The apparatus according to claim 12, the apparatus further caused to receive, from the first base station, an order for the second base station to use at least one user equipment associated with the second base station to transmit a reference signal; and use the at least one user equipment associated with the second base station to transmit the reference signal.

17. A computer program embodied on a non-transitory computer readable medium, the computer program configured to control a processor to perform a process, the process comprising:

sending, to a first base station, an indication for a second base station to use flexible time division duplex mode, which at least partially causes cross-link interference, before the second base station transmits using the flexible time division duplex mode;

receiving instructions from the first base station for adjusting a transmission power of the second base station based on the cross-link interference; and adjusting the transmission power of the second base station in accordance with the instructions in order to reduce the cross-link interference.

18. A system comprising:

a first apparatus, comprising at least one first processor; and at least one first memory including first computer program code, the at least one first memory and the first computer program code are configured, with the at least one first processor, to cause the first apparatus at least to receive, by a first base station, an indication for a second base station to use flexible time division duplex mode, which at least partially causes cross-link interference, before the second base station transmits using the flexible time division duplex mode;

assess an amount of the cross-link interference that will be caused by the second base station;

decide how to adjust a transmission power of the second base station based on the cross-link interference; and send the second base station a request to adjust the transmission power in order to reduce the cross-link interference; and a second apparatus, comprising at least one second processor; and at least one second memory including second computer program code, the at least one second memory and the second computer program code are configured, with the at least one second processor, to cause the second apparatus at least to send, to the first base station, the indication for the second base station to use flexible time division duplex mode, which at least partially causes the cross-link interference, before the second base station transmits using the flexible time division duplex mode;

receive instructions from the first base station for adjusting the transmission power of the second base station based on the cross-link interference; and adjust the transmission power of the second base station in accordance with the instructions in order to reduce the cross-link interference.

\* \* \* \* \*